United States Patent
Gripemark et al.

(10) Patent No.: US 7,681,698 B2
(45) Date of Patent: Mar. 23, 2010

(54) DISC BRAKE

(75) Inventors: Joakim Gripemark, Helsingborg (SE); Patrik Kall, Helsingborg (SE); Goran Stensson, Brosarp (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 11/445,839

(22) Filed: Jun. 2, 2006

(65) Prior Publication Data

US 2006/0260889 A1    Nov. 23, 2006

Related U.S. Application Data

(63) Continuation of application No. PCT/SE2004/001795, filed on Dec. 3, 2004.

(30) Foreign Application Priority Data

Dec. 5, 2003    (SE) .................................... 0303279

(51) Int. Cl.
    *F16D 65/12*    (2006.01)
(52) U.S. Cl. ................ 188/264 A; 188/18 A; 188/71.6; 188/218 XL
(58) Field of Classification Search ............ 188/264 A, 188/264 R, 264 AA, 382, 17, 18 A, 18 R, 188/71.6, 218 XL
See application file for complete search history.

(56) References Cited

U.S. PATENT DOCUMENTS

| | | | |
|---|---|---|---|
| 3,899,054 A | * | 8/1975 | Huntress et al. ....... 188/218 XL |
| 4,071,360 A | | 1/1978 | Mannino, Jr. |
| 6,135,247 A | | 10/2000 | Bodin et al. |
| 6,419,056 B1 | | 7/2002 | Dyko et al. |
| 6,446,765 B1 | | 9/2002 | Dabertrand et al. |
| 6,626,273 B1 | | 9/2003 | Baumgartner et al. |

FOREIGN PATENT DOCUMENTS

| | | | |
|---|---|---|---|
| DE | 20 02 437 | | 7/1971 |
| DE | 27 42 468 | | 3/1979 |
| DE | 19628331 A1 | | 1/1998 |
| DE | 19751522 A1 | | 5/1999 |
| DE | 19843399 A1 | | 3/2000 |
| WO | WO 93/14947 | | 8/1993 |
| WO | WO 00/14423 | * | 3/2000 |
| WO | WO02051771 A1 | * | 7/2002 |

* cited by examiner

*Primary Examiner*—Xuan Lan Nguyen
(74) *Attorney, Agent, or Firm*—St. Onge Steward Johnston & Reens LLC

(57) ABSTRACT

A brake disc for a disc brake having one or more sliding or not sliding discs on a hub or other central part is provided. The brake disc has an outer circumference and an inner circumference with a number of alternating teeth and gaps on the inner circumference. One or more measures are taken to reduce the risk of crack formation. One of the measures is to arrange areas of reduced material thickness at and/or adjacent each tooth. The areas of reduced material thickness may be openings having an axial or radial extent. Other measures include designing the teeth and gaps in an appropriate way and forming the brake disc with different properties at different parts.

21 Claims, 2 Drawing Sheets

DISC BRAKE

CROSS-REFERENCE TO RELATED APPLICATIONS

The present application is a continuation of pending International patent application PCT/SE2004/001795 filed on Dec. 3, 2004 which designates the United States and claims priority from Swedish patent application 0303279-4 filed on Dec. 5, 2003, the content of which is incorporated herein by reference.

FIELD OF THE INVENTION

The present invention concerns a brake disc to be used in a disc brake having one or more sliding or not sliding discs on a hub, a central part connected to the hub or any similar part. The present invention concerns the type of brake discs having teeth or the like on an inner circumference.

BACKGROUND OF THE INVENTION

For disc brakes having one or more sliding discs the discs are normally received on a hub or other central part rotating in conjunction with the associated wheel. To simplify the description the term "central part" is used in a broad sense and is to be construed as covering any part receiving the brake disc(s), including a hub. The central part normally has splines, teeth or the like on an outer circumference for co-operation with teeth, splines or the like on an inner circumference of the brake disc. In that way the discs are rotationally fixed to the central part but may move in axial direction on the central part. On the same central part one or more discs may be received fixed in axial direction, while one or more discs are received moveable in axial direction. The contact faces of the teeth, splines or the like may be straight or arced.

As used in this description the expressions "radial", "axial", and similar expressions are in relation to the brake disc. Thus, "axial" is the direction of the rotational axis of the brake disc. "Tangential direction" as used here refers to the direction of rotation of the brake disc. Thus, the "tangential direction" is perpendicular to the "radial direction" as well as to the "axial direction".

In a disc brake one or more brake pads and one or more brake discs are pressed against each other during brake actuation. The rotation of the central part receiving the discs and the rotation of an associated wheel are interconnected. Thus, the braking of the rotation of the brake discs will be transferred to a braking of the associated wheel.

During braking the connections between the central part and the discs are subject to mechanical strains caused by large braking forces, by heat etc.

The brake disc is considerably heated up during braking, due to the fact that it absorbs kinetic energy from the vehicle. The heating of the disc leads to a heat expansion. However, the disc may have different heat expansions due to uneven heating. The inner part, i.e. the part closest to the central part, may be much less heated than the main part, i.e. the rest of the brake disc. The lower heating of the inner part of the disc is often due to the teeth connection with the central part, which prevents this area from being effectively squeezed, swept and heated up by the brake pads. The uneven heating leads to tangential tension and possible crack formation in the brake disc.

The inner part of the disc having teeth provides uneven resistance against the forced tangential tension caused by the uneven heating of the disc. This gives an uneven distribution of the forced tension so that the material just radially outside the gaps will get an enlarged proportion of the total tangential tension.

Large bending stresses appear at the teeth roots at braking. If the brake is applied to produce a large braking torque when the brake disc has got the uneven temperature distribution described above, the bending stresses may add extra tension to the material close to and radially outside the gaps. This material is already heavily strained by the thermal expansion of the material in the main part of the disc and the extra tension may create a very high total tension of the material.

SUMMARY OF THE INVENTION

One object of the present invention is to avoid brake disc cracks caused by uneven elongation characteristics to as large extent as possible. A major problem regarding the brake disc is that it will be unevenly heated during braking. The effects of the uneven heating are aggravated by uneven elongation characteristics of the disc, which uneven elongation characteristics in large extent are due to the presence of teeth. To avoid cracks the above stated negative influences are diminished in as large extent as possible.

One option to reduce the risk of crack formation is to have relatively wide gaps between adjacent teeth.

Another option is to reduce the material thickness in each tooth and/or areas adjacent to the tooth. As an alternative at least some of the areas of reduced material thickness may be replaced by holes in each tooth and/or in an area adjacent to the tooth. The holes may have either an axial or a radial extension. Holes of any direction and other areas of reduced thickness may be combined in many different ways. By these measures the resistance against forced tension in the teeth and the material radially outside the teeth will be reduced and assist in distributing the forced tension more even between the material outside the teeth and the material outside the gaps between the teeth. Material thickness is defined in the direction of the rotational axis of the disc. Furthermore, the material thickness is determined as a net thickness, i.e. hole dimensions are subtracted from the total outer dimensions.

A further option is to optimise the form of the tooth roots and the bottom of the gap between adjacent teeth. If the radius at the root of a tooth is relatively large and the bottom of the gap has a straight or almost straight part a more even distribution of the tensions is achieved in the brake disc. In practice the bottom of the gap may often have a small bend, e.g. due to manufacturing procedures. By proper design of the radius at the transition, in relation to the size of the straight part of the bottom of the gap, the risk of crack formation is reduced.

Yet a further option is to form the brake disc with varying properties, to increase the ability to withstand tensions. The material in the area of the teeth may be treated to stand higher tension than the material in the rest of the disc. Brake discs are often made of cast iron as it provides good thermal conductivity. Cast iron, in its most common form with flaked graphite, is a brittle material with poor ability to stand forced tension. By use of particular alloy elements and a well-controlled casting process the cast iron can be modified to get its graphite particles either in the form of spheres, called nodular iron or ductile iron, or in a worm-like form, called compacted graphite iron. In practice the cooling at casting or forging is controlled, which together with the choice of material give the desired effect of different properties of different parts of the brake disc.

Further objects and advantages of the present invention will be obvious to a person skilled in the art when reading the detailed description below of at present preferred embodiments.

BRIEF DESCRIPTION OF THE DRAWINGS

The invention will be described further below by way of examples and with reference to the enclosed drawings. In the drawings.

DETAILED DESCRIPTION OF THE INVENTION

Figure 1:
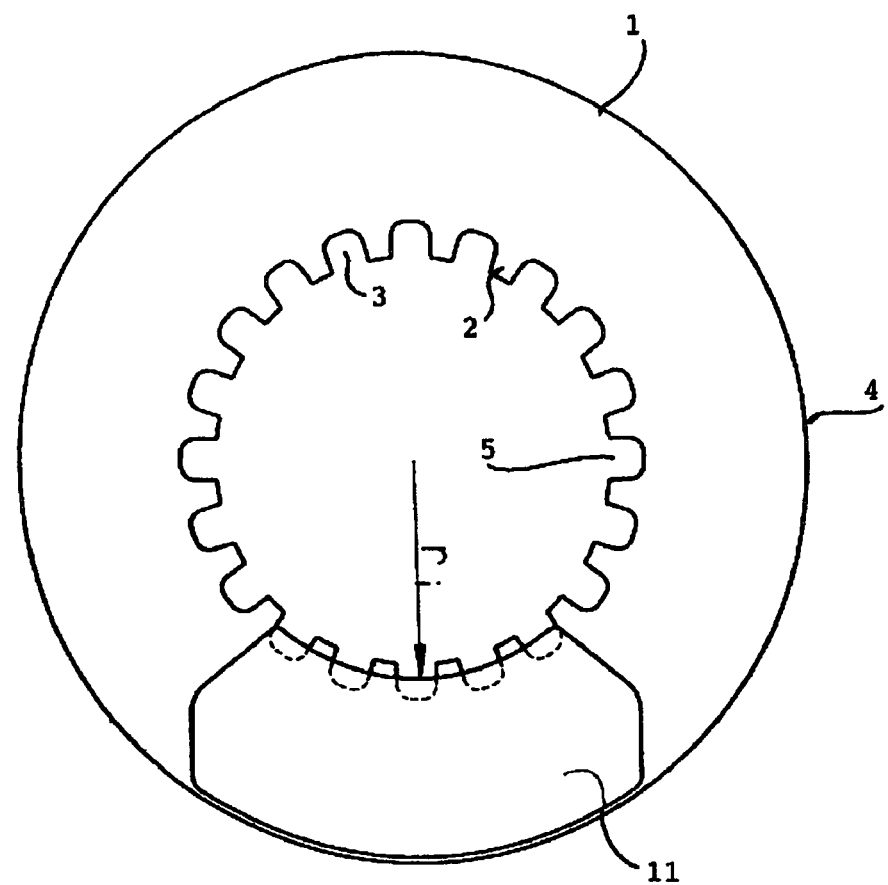
FIG. 1 is a side view of a brake disc according to the present invention.

The brake disc 1 of FIG. 1 has a number of teeth 2 separated by gaps 3. The brake disc 1 is circular with an outer circumference 4 and an inner circumference 5. The teeth 2 are arranged on the inner circumference 5 of the brake disc 1. The brake disc 1 is to be received on a hub or other central part (not shown) of a disc brake. The teeth 2 of the brake disc 1 are to co-operate with teeth, splines or the like on the central part. The disc 1 is received on the central part fixed in rotational direction and is received either fixed or moveable in axial direction. A person skilled in the art realises that the number of teeth 2 and gaps 3 may vary from brake disc 1 to brake disc. Also the form, placement and size of the teeth 2 and gaps 3 may vary both between different discs 1 and in one disc 1. Groups of teeth 2 may e.g. be separated by gaps being larger than the gaps between the teeth of the group in one and the same brake disc.

Brake pads 11 or the like will coact with the brake disc in brake actuation, as is well known in the art. A person skilled in the art realises that the design of the other parts of the disc brake may vary. In view of this the disc brake as such will not be described extensively here.

Figure 2:
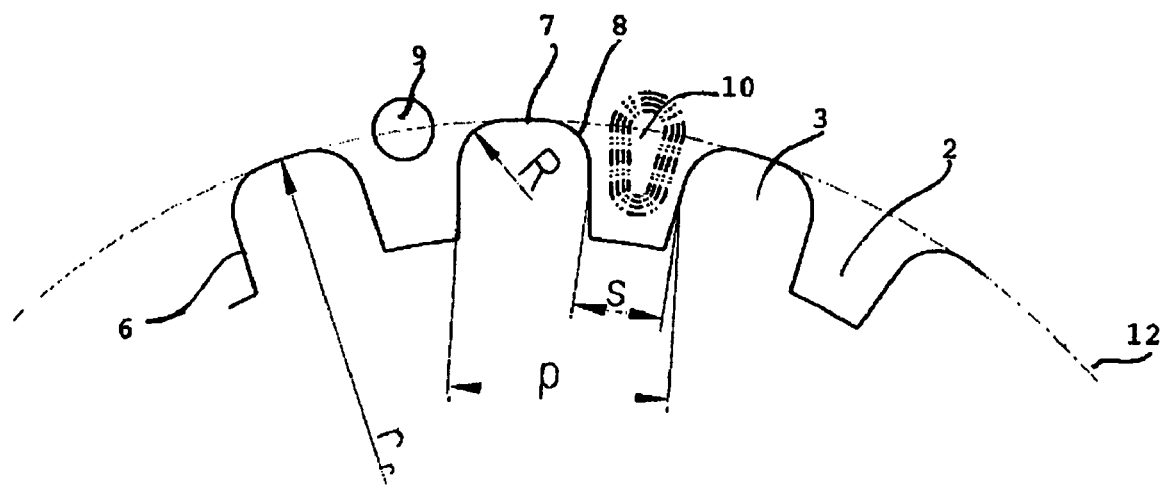
FIG. 2 is a part view taken at the inner circumference of the disc of FIG. 1.

The teeth 2 are shown having straight tooth faces 6. However, the invention is not limited to straight tooth faces 6, it is applicable for tooth faces having any arc form. In FIG. 2 the tooth width, s, and pitch, p, are shown. In this description the tooth width, s, for arc-formed teeth are taken as the chordal width at the pitch circle. The pitch, p, for arc-formed teeth is of course also taken at the pitch circle. The pitch circle is an imaginary circle with a radius equal to the average of the radii of imaginary circles at the tops of the disc teeth and at the bottoms of the gaps between the disc teeth. The dimensions of the pitch p and the tooth width s dictate the dimension of the gaps 3 in the tangential direction. In order to reduce the risk of crack formation the pitch p should be markedly larger than the tooth width s. This is achieved if the following function is fulfilled: $p>1.6s$, preferably $p>2s$ and most preferred $p>2.5s$. This will reduce the effect that the material radially outside the gaps 3 takes an extremely large proportion of the total forced tangential tension.

The transition 8 at each tooth root, where one tooth 2 goes over into a gap 3, has the form of an arc with the radius R. The bottom of the gap 3 between the transitions 8 forms a straight part 7. To have a positive effect of the design of the transitions 8 and the straight part 7, the straight part 7 should be shorter than 1.5R, preferably shorter than 1.0R and most preferred shorter than 0.6R. Even though the bottom is shown having a straight part 7, as indicated above the bottom may be slightly curved.

As indicated in FIG. 2 openings or holes 9 may be formed in the teeth 2, in the area radially just outside the teeth 2 and/or in the transition area between the teeth 2 and the main part of the brake disc 1. The same effect is achieved if the material thickness is reduced without forming a through hole in an area 10 in the teeth 2, just radially outside the teeth 2 or in a transition area there between. As used in this description the expression "area of reduced material thickness" and similar expressions normally refers both to areas 10 having no through opening and areas having openings or holes 9.

Figure 3:
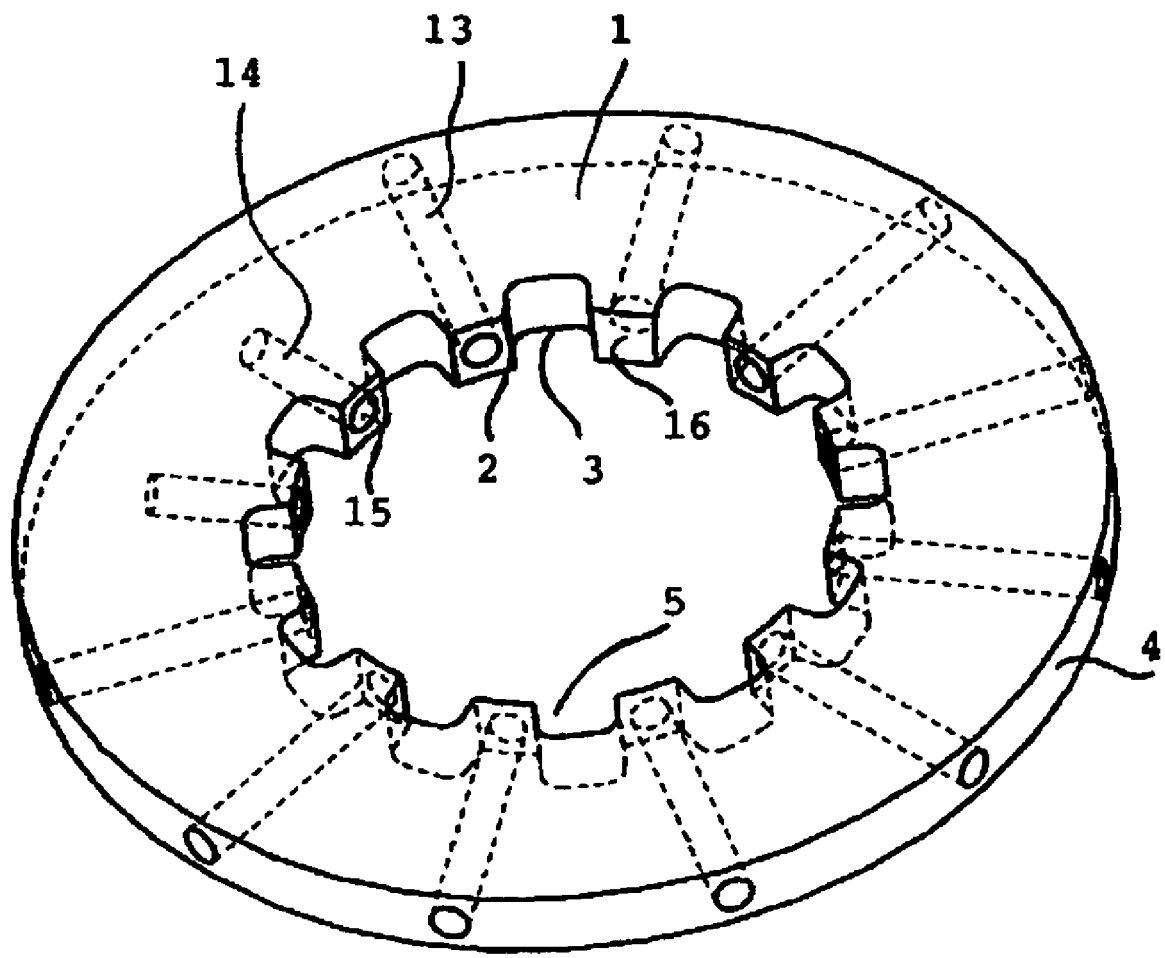
FIG. 3 is an alternative embodiment of a brake disc according to the present invention.

In FIG. 3 further alternatives regarding openings or holes are indicated. The holes shown have a radial extension. The holes 13 may be through holes going all the way from the outer circumference 4 through one tooth 2 and forming an opening 15 at the side facing inwards. Other holes 14 are blind holes going in radial direction from a respective tooth 2 of the brake disc 1, having an opening 15 at the side facing inwards. In some embodiments the hole 13, 14 ends short of the side facing inwards, in which case there will be a whole inner surface of the tooth, as indicated by the reference sign 16. It is possible to have openings 13, 14 of varying length in one single brake disc 1, without raising the risk of crack formation. Irrespectively of the extent of the holes 13, 14 and whether they end before the outer or inner circumference 4, 5 they should always extend over an imaginary circle 12 at the radius of the bottoms 7 of the disc teeth gaps 3. The holes 13, 14 may have a circular, oval, square or any polygonal cross section. The radial openings 13, 14 are arranged in the teeth 2 and never in the gaps 3 of the brake disc 1.

Even small reductions of the material thickness in axial direction are beneficial. A person skilled in the art realises that the exact form of the areas of reduced material thickness may vary irrespectively if the areas are holes 9, 13, 14 or areas 10 having no through hole. Irrespectively of if holes 9, 13, 14 areas 10 of reduced thickness or a combination of holes 9, 13, 14 and areas 10 of reduced thickness are used the forced tension is more evenly distributed. The thickness reduction areas 10 or the holes 9, 13, 14 are normally produced in the casting or forging of the disc 1, but may of course be separately machined. The holes 9, 13, 14 or areas 10 of reduced thickness are preferably placed partly on an imaginary circle 12 at the radius of the bottoms 7 of the disc teeth gaps 3.

By giving the material of the brake disc 1 different properties at different parts the ability to withstand strain is increased. Thereby the risk of crack formation is reduced. For brake discs 1 made of cast iron the graphite may be brought to a spherical or worm-like shape in the area of the teeth 2, while the graphite of the main part of the disc 1 has a flake-like shape. This effect may be achieved by the use of controlled cooling during casting, in combination with the use of a suitable material composition, like thoroughly tested proportions of magnesium.

The thickness reductions or different properties of the material at the brake disc 1 should be of such a number and be designed and placed in such a way that the desired advantage concerning expansion are fulfilled. At the same time the strength of the teeth 2 regarding bending and contact pressure should not be too negatively influenced.

By taking one or more of the above measures the risk of crack formation is strongly reduced. A person skilled in the art realises that the above measures may be used in any combination.

What is claimed is:

1. A brake disc to be used as an axially fixed or sliding disc in a disc brake, comprising: an outer circumference; an inner circumference; a number of alternating teeth and gaps along the inner circumference; and a means to reduce uneven elongation characteristics of the brake disc, wherein the brake disc has areas of reduced material thickness at each tooth compared with the material thickness at a bottom of each tooth gap, wherein at least some of the areas of the reduced material thickness extend radially outward past an imaginary circle at least partially defined by the bottom of the gaps; wherein the bottom of each gap is formed by arc-formed transition parts with adjacent teeth and a substantially straight part between the transition parts; wherein each transition part has a radius (R), and wherein a length of each substantially straight part is less than 1.5R.

2. The brake disc of claim 1, wherein at least some of the areas of reduced material thickness are radial holes.

3. The brake disc of claim 2, wherein each radial hole goes through a tooth.

4. The brake disc of claim 2, wherein one or more of the radial holes are blind holes, ending at a distance from one of the inner circumference and outer circumferences of the brake disc.

5. The brake disc of claim 1, wherein the areas of reduced material thickness are formed during casting or forging of the disc.

6. The brake disc of claim 1, wherein the areas of reduced material thickness are formed in a separate machine operation.

7. The brake disc of claim 1, wherein the areas of reduced material thickness are placed partly on the imaginary circle having a radius of the bottoms of the gaps.

8. The brake disc of claim 1, wherein faces of the teeth are one of straight faces and arced faces.

9. The brake disc of claim 1, wherein the relation between a pitch (p) and a tooth width (s) of the inner circumference is p>1.6s.

10. The brake disc of claim 1, wherein the material thickness along the outer circumference of the brake disc is constant.

11. The brake disc of claim 10, wherein the material thickness along the outer circumference of the brake disc is equal to the material thickness at the bottom of each tooth gap.

12. The brake disc of claim 1, wherein the areas of reduced material thickness are axial are blind axial holes.

13. A brake disc to be used as an axially fixed or sliding disc in a disc brake, comprising: an outer circumference; an inner circumference; a number of alternating teeth and gaps along the inner circumference; and a means to reduce uneven elongation characteristics of the brake disc, wherein the brake disc has areas of reduced material thickness at each tooth, compared with the material thickness at a bottom of each tooth gap, wherein at least some of the areas of the reduced material thickness extend radially outward past an imaginary circle at least partially defined by the bottom of the gaps, wherein the material thickness along the outer circumference of the brake disc is constant, wherein the bottom of each gap is formed by arc-formed transition parts with adjacent teeth and a substantially straight part between the transition parts; and wherein each transition part has a radius (R), and wherein a length of each substantially straight part is less than 1.5R.

14. The brake disc of claim 13, wherein at least some of the areas of reduced material thickness are radial holes.

15. The brake disc of claim 14, wherein each radial hole goes through a tooth.

16. The brake disc of claim 14, characterized wherein one or more of the radial holes are through holes going from a side of tooth facing inwards to the outer circumference of the brake disc.

17. The brake disc of claim 14, wherein one or more of the radial holes are blind holes, ending at a distance from one of the inner circumference and outer circumferences of the brake disc.

18. The brake disc of claim 13, wherein the relation between a pitch (p) and a tooth width (s) of the inner circumference is p>1.6s.

19. The brake disc of claim 13, wherein the brake disc is made of cast iron having graphite of spherical or worm-like or flake-like shape.

20. The brake disc of claim 13, wherein the areas of reduced material thickness are blind axial holes.

21. The brake disc of claim 13, wherein the material thickness along the outer circumference of the brake disc is equal to the material thickness at the bottom of each tooth gap.

* * * * *